(12) United States Patent
Mody et al.

(10) Patent No.: US 11,995,472 B2
(45) Date of Patent: May 28, 2024

(54) MEMORY SHARING FOR MACHINE LEARNING PROCESSING

(71) Applicant: Texas Instruments Incorporated, Dallas, TX (US)

(72) Inventors: Mihir Narendra Mody, Bengaluru (IN); Kedar Satish Chitnis, Bengaluru (IN); Kumar Desappan, Bengaluru (IN); David Smith, Allen, TX (US); Pramod Kumar Swami, Bengaluru (IN); Shyam Jagannathan, Bengaluru (IN)

(73) Assignee: Texas Instruments Incorporated, Dallas, TX (US)

(*) Notice: Subject to any disclaimer, the term of this patent is extended or adjusted under 35 U.S.C. 154(b) by 494 days.

(21) Appl. No.: 17/378,841

(22) Filed: Jul. 19, 2021

(65) Prior Publication Data

US 2023/0013998 A1    Jan. 19, 2023

(51) Int. Cl.

| | |
|---|---|
| *G06F 9/50* | (2006.01) |
| *G06F 9/455* | (2018.01) |
| *G06F 12/00* | (2006.01) |
| *G06F 12/02* | (2006.01) |
| *G06N 3/02* | (2006.01) |
| *G06N 3/10* | (2006.01) |
| *G06N 20/00* | (2019.01) |

(52) U.S. Cl.
CPC .......... *G06F 9/5016* (2013.01); *G06F 9/5077* (2013.01); *G06F 12/00* (2013.01); *G06F 12/0223* (2013.01); *G06F 2009/45583* (2013.01); *G06F 9/50* (2013.01); *G06F 9/5022* (2013.01); *G06N 3/02* (2013.01); *G06N 3/10* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,736,029 | B2 * | 8/2017 | He | H04L 47/781 |
| 11,610,102 | B1 * | 3/2023 | Zejda | G06N 3/063 |
| 2019/0042925 | A1 * | 2/2019 | Choe | G06N 3/063 |
| 2021/0081122 | A1 * | 3/2021 | Kim | G06N 3/082 |
| 2022/0066928 | A1 * | 3/2022 | Tavallaei | G06F 12/123 |

* cited by examiner

*Primary Examiner* — Qing Yuan Wu
(74) *Attorney, Agent, or Firm* — Brian D. Graham; Frank D. Cimino

(57) ABSTRACT

Techniques for executing machine learning (ML) models including receiving an indication to run an ML model on a processing core; receiving a static memory allocation for running the ML model on the processing core; determining that a layer of the ML model uses more memory than the static memory allocated; transmitting, to a shared memory, a memory request for blocks of the shared memory; receiving an allocation of the requested blocks; running the layer of the ML model using the static memory and the range of memory addresses; and outputting results of running the layer of the ML model.

20 Claims, 13 Drawing Sheets

MEMORY SHARING FOR MACHINE LEARNING PROCESSING

BACKGROUND

Machine learning (ML) is becoming an increasingly important part of the computing landscape. Machine learning is a branch of artificial intelligence (AI), and ML helps enable a software system to learn to recognize patterns from data without being directly programmed to do so. Neural networks (NN) are a type of ML that utilize a set of linked and layered functions (e.g., nodes, neurons, etc.) that are weighted to evaluate input data. In some NNs, sometimes referred to as convolution neural networks (CNNs), convolution operations are performed in NN layers based on inputs received and weights rather than matrix multiplication used in traditional NN. Layers in CNNs may perform many types of functions, including, but not limited to, convolution, deconvolutional, pooling, up-sample, etc, CNNs are often used in a wide array of applications typically for recognition and classification, such as image recognition and classification, prediction and recommendation systems, speech and language recognition and translation, etc.

As ML becomes increasingly useful, there is a desire to execute complex ML techniques, such as NNs and CNNs, efficiently in devices with relatively limited compute and memory resources, such as embedded, or other low-power devices. To help efficiently run a given ML model, the ML model may be analyzed and optimized to tailor how the ML model is run to a target hardware resources to be used.

SUMMARY

This disclosure relates to a technique for executing machine learning (ML) models. The technique includes receiving an indication to run an ML model on a processing core; receiving a static memory allocation for running the ML model on the processing core; determining that a layer of the ML model uses more memory than the static memory allocated; transmitting, to a shared memory, a memory request for blocks of the shared memory; receiving an allocation of the requested blocks; running the layer of the ML model using the static memory and the range of memory addresses; and outputting results of running the layer of the ML model.

Another aspect of the present disclosure relates to an electronic device, comprising a memory; and one or more processors operatively coupled to the memory, wherein the one or more processors are configured to execute instructions causing the one or more processors to receive an indication to run a machine learning (ML) model on a processing core; receive a static memory allocation for running the ML model on the processing core; determine that a layer of the ML model uses more memory than the static memory allocated; transmit, to a shared memory portion of the memory, a memory request for blocks of the shared memory; receive an allocation of the requested blocks; run the layer of the ML model using the static memory and the range of memory addresses; and output results of running the layer of the ML model.

Another aspect of the present disclosure relates to a non-transitory program storage device comprising instructions stored thereon to cause one or more processors to receive a set of ML models; simulate running the set of ML models on a target hardware; determine an amount of static memory and shared memory resources of the target hardware for running layers of ML models of the set of ML models based on the simulated runs, wherein the amount of static memory is less than a maximum amount of memory used by the layers of the ML models, wherein the maximum amount of memory used is determined based on the simulation.

BRIEF DESCRIPTION OF THE DRAWINGS

For a detailed description of various examples, reference will now be made to the accompanying drawings in which.

DETAILED DESCRIPTION

As ML has becoming more common and powerful, hardware configured to execute ML models has been introduced. As used herein, an ML model may refer to an implementation of one or more ML algorithms which model a behavior, such as object recognition, behavior of a circuit, behavior of a neuron, etc. In cases where a target hardware for executing ML models are known, the ML models may be optimized for the target hardware configurations to help enhance performance. For example, ML models for object recognition, low-light enhancement, and facial recognition may be optimized to execute on a particular a mobile device, such as a smartphone configured with a certain ML processor. As another example, ML models for object recognition, movement prediction, and behavioral prediction may be optimized to execute on specific hardware found in certain partially or fully self-driving automobiles.

Example ML Model

Figure 1:
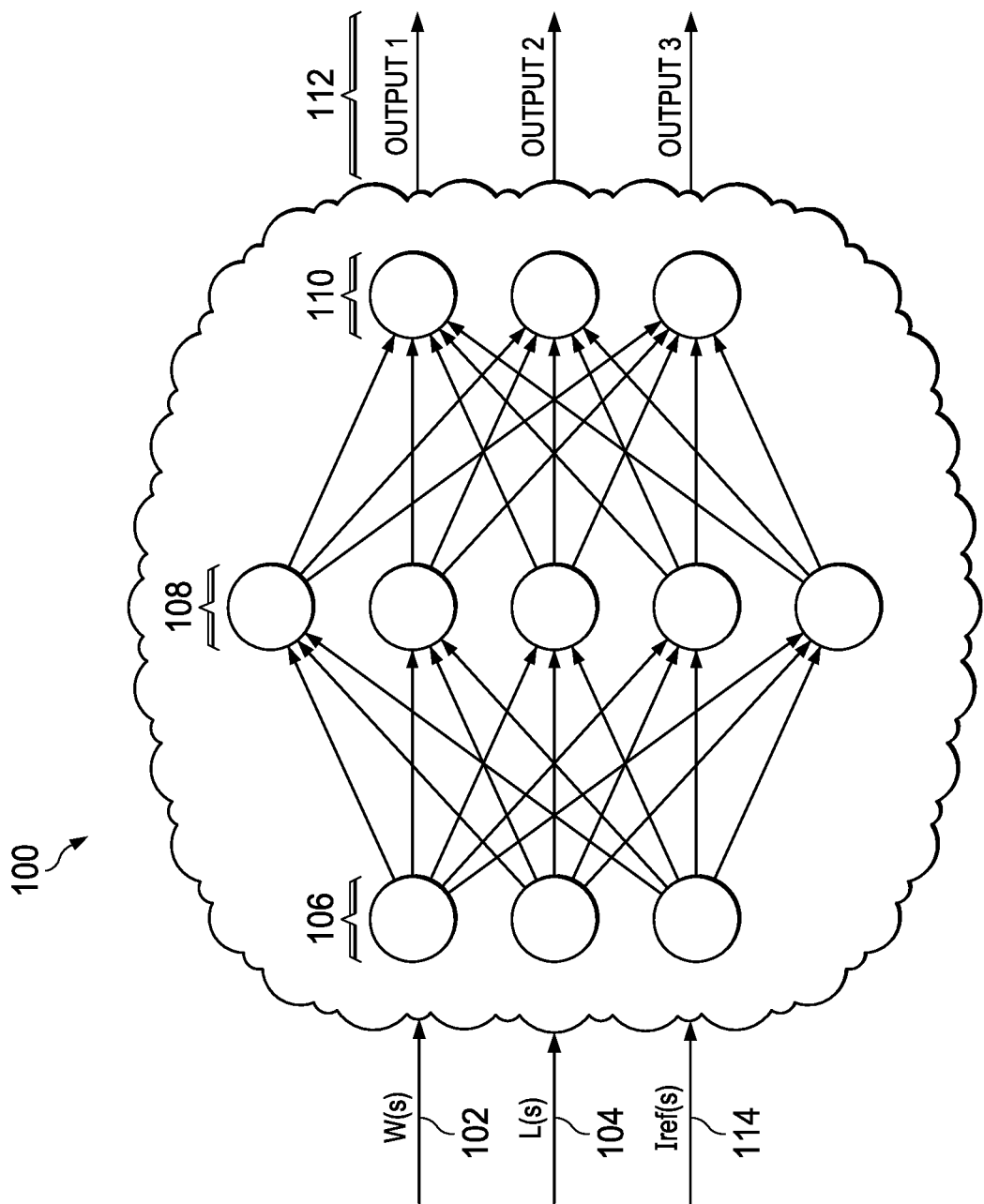
FIG. 1 illustrates an example neural network ML model, in accordance with aspects of the present disclosure.

FIG. 1 illustrates an example neural network ML model 100, in accordance with aspects of the present disclosure. The example neural network ML model 100 is a simplified example presented to help understand how a neural network ML model 100, such as a CNN, is structured and trained. Examples of neural network ML models may include LeNet, Alex Net, Mobilnet, etc. It may be understood that each implementation of an ML model may execute one or more ML algorithms and the ML model may be trained or tuned in a different way, depending on a variety of factors including, but not limited to, a type of ML model being used, parameters being used for the ML model, relationships as among the parameters, desired speed of training, etc. In this simplified example, parameter values of W, L, and iref are parameter inputs 102, 104, and 114 are passed into the ML model 100. Each layer (e.g., first layer 106, second layer 108, and third layer 110) includes a plurality of nodes (e.g., neurons) and generally represents a set of operations performed on the parameters, such as a set of matrix multiplications, convolutions, deconvolutions, etc. For example, each node may represent a mathematical function that takes, as input (aside from the nodes of the first layer 106), output from a previous layer and a weight. The ML model outputs 112 are output from the last layer (e.g., the third layer 110). The weight is typically adjusted during ML model training and fixed after the ML model training. The specific mathematical function of the node can vary depending on ML model implementation. While the current example addresses three layers, in certain cases the ML model may include any number of layers. Generally, each layer transforms M number of input parameters to N number of output parameters. The parameter inputs to the first layer 106 are output as inputs to the second layer 108 with a set of connections. As each node of a layer (such as first layer 106) outputs to each node in a subsequent layer (such as second layer 108), ML model 100 is a fully connected neural network. Other embodiments may utilize a partially connected neural network or another neural network design which may not connect each node of a layer to each node of a subsequent layer, where some node connections may skip layers, where no feedback is provided from output to inputs (e.g., Feed Forward CNN), etc.

In this example, first layer 106 represents a function based on a set of weights that are applied to the input parameters (e.g., input parameters 102 and 104) to generate output from first layer 106 that is input to the second layer 108. Different weights may be applied for the input received from each node of the previous layer by the subsequent layer. For example, for a node of the second layer 108, the node applies weights to input received from nodes of the first layer 106 and the node may apply a different weight to input received from each node of the first layer 106. Nodes compute one or more functions based on the inputs received and corresponding weights and outputs a number. For example, the node may use a linear combination function which multiplies an input values from a node of the previous layer with a corresponding weight and sums across the results of the multiplication, coupled with a non-linear activation function which acts as a floor for the resulting number for output. It may be understood that any known weighted function may be applied by the node within the scope of this disclosure. This output number may be input to subsequent layers, or if the layer is a final layer, such as third layer 110 in this example, the number may be output as a result (e.g., output parameters or ML model outputs 112).

In some cases, the functions applied by nodes of a layer may differ as between layers. In some cases, each layer may have different resource requirements. For example, when the functions of multiple nodes are performed by a processor, the different functions may have different loads on the processor. Additionally, some functions may have different input or output parameters and thus consume more, or less, memory space and bandwidth. These differing processor and memory loads may also influence an amount of energy to power the processor and memory, as well as an amount of heat generated.

After an ML model, such as neural network ML model 100, is defined with respect to nodes, layers, etc., the ML model may be trained. In some cases, the ML model 100 may be trained using a labelled data set corresponding to data to be input to ML model 100. For example, an object recognizer may be trained on images of objects. These images may include metadata labelling the object(s) in the image. The ML model 100 may be initiated with initial weights and the images input to the ML model 100 to generate predictions. The weights of the nodes may be adjusted based on how accurate the prediction is as compared to the labels. The weights applied by a node may be adjusted during training based on a loss function, which is a function that describes how accurately the predictions of the neural network are as compared to the expected results; an optimization algorithm, which helps determine weight settings adjustments based on the loss function; and/or a backpropagation of error algorithm, which applies the weight adjustments back through the layers of the neural network. Any optimization algorithm (e.g., gradient descent, mini-batch gradient descent, stochastic gradient descent, adaptive optimizers, momentum, etc.), loss function (e.g., mean-squared error, cross-entropy, maximum likelihood, etc.), and backpropagation of error algorithm (e.g., static or recurrent backpropagation) may be used within the scope of this disclosure.

In some cases, training the ML model 100 is performed during development of the ML model 100 and may be performed by a system or device separate from the system or device that runs the trained ML model.

Example Hardware for Executing ML Models

Figure 2:
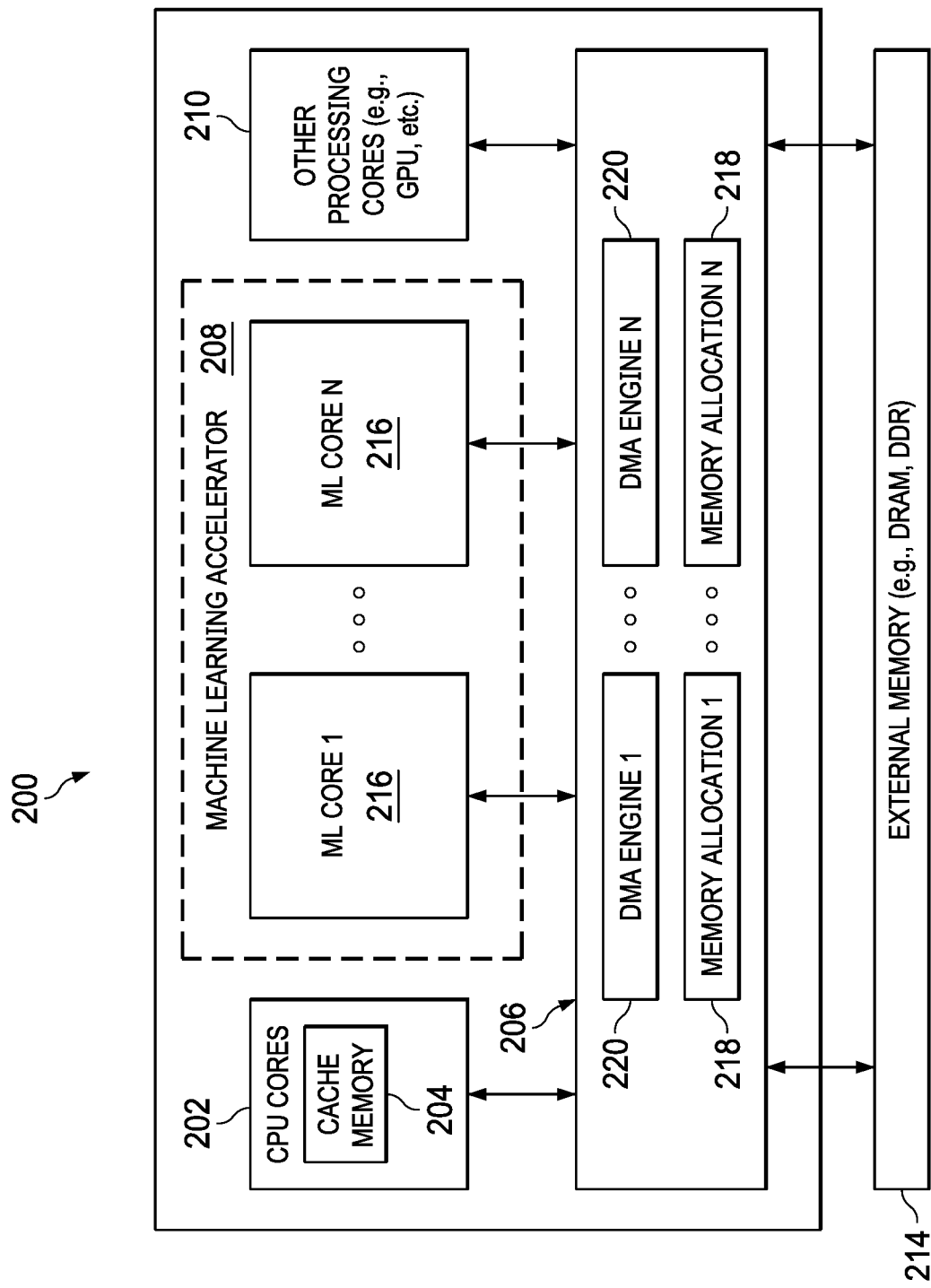
FIG. 2 is a block diagram of a device including hardware for executing ML models, in accordance with aspects of the present disclosure.

FIG. 2 is a block diagram 200 of a device including hardware for executing ML models, in accordance with aspects of the present disclosure. The device may be system on a chip (SoC) including multiple components configured to perform different tasks. As shown, the device includes one or more central processing unit (CPU) cores 202, which may include one or more internal cache memories 204. The CPU cores 202 may be configured for general computing tasks.

The CPU cores 202 may be coupled to a crossbar (e.g., interconnect) 206, which interconnects and routes data between various components of the device. In some cases, the crossbar 206 may be a memory controller or any other circuit that can provide an interconnect between peripherals. Peripherals may include master peripherals (e.g., components that access memory, such as various processors, processor packages, direct memory access/input output components, etc.) and slave peripherals (e.g., memory components, such as double data rate random access memory, other types of random access memory, direct memory access/input output components, etc.). In this example, the crossbar 206 couples the CPU cores 202 with other peripherals, such as an ML accelerator 208 and other processing cores 210, such as a graphics processing unit, radio basebands, coprocessors, microcontrollers, etc., and external memory 214, such as double data rate (DDR) memory, dynamic random access memory (DRAM), flash memory, etc., which may be on a separate chip from the SoC. The crossbar 206 may include or provide access to one or more internal memories that may include any type of memory, such as static random access memory (SRAM), flash memory, etc. The ML accelerator 208 may include one or more ML cores 216. The ML cores 216 may be processor cores configured to accelerate machine learning models and the ML cores 216 may include one or more internal caches (not shown).

In operation, such as when executing one or more ML models, the ML cores 216 may store and access data for executing the one or more ML models in a scratch memory to help improve performance, as compared to storing and accessing the data in the external memory 214. In some cases, an amount of data needed by the ML model varies based on the ML models. For example, the amount of data may vary based on the inputs and outputs of layers of the ML model, operations performed in the layers, number of nodes in the layers, etc. In some cases, an amount of scratch memory may be allocated for use by each executing ML model. In this example, the ML accelerator 208 may include N ML cores 216 executing N ML models with a corresponding N static memory allocations 218. The size of the memory allocations 218 may be fixed based on the ML model. The static memory allocations 218 may be made from the one or more internal memories included in, or accessible via the crossbar 206.

To help facilitate the ML cores 216 and executing ML models access the memory allocations 218, the crossbar may include N direct memory access (DMA) engines 220. In some cases, each DMA engine may be associated with a particular ML core 216. The DMA engines 220 may be used by applications, such as ML models, to perform memory operations and/or to offload memory management tasks from a processor. Of note, for simplicity, each ML core 216 is described as executing a single ML model, but it should be understood that any number of ML models may execute on any ML core 216 and these ML models may access a corresponding number of static memory allocations 218. In some cases, the DMA engines 220 along with sufficient scratch memory for the static memory allocations 218 may be integrated on the ML cores 216.

ML Model Compilation

Figure 3:
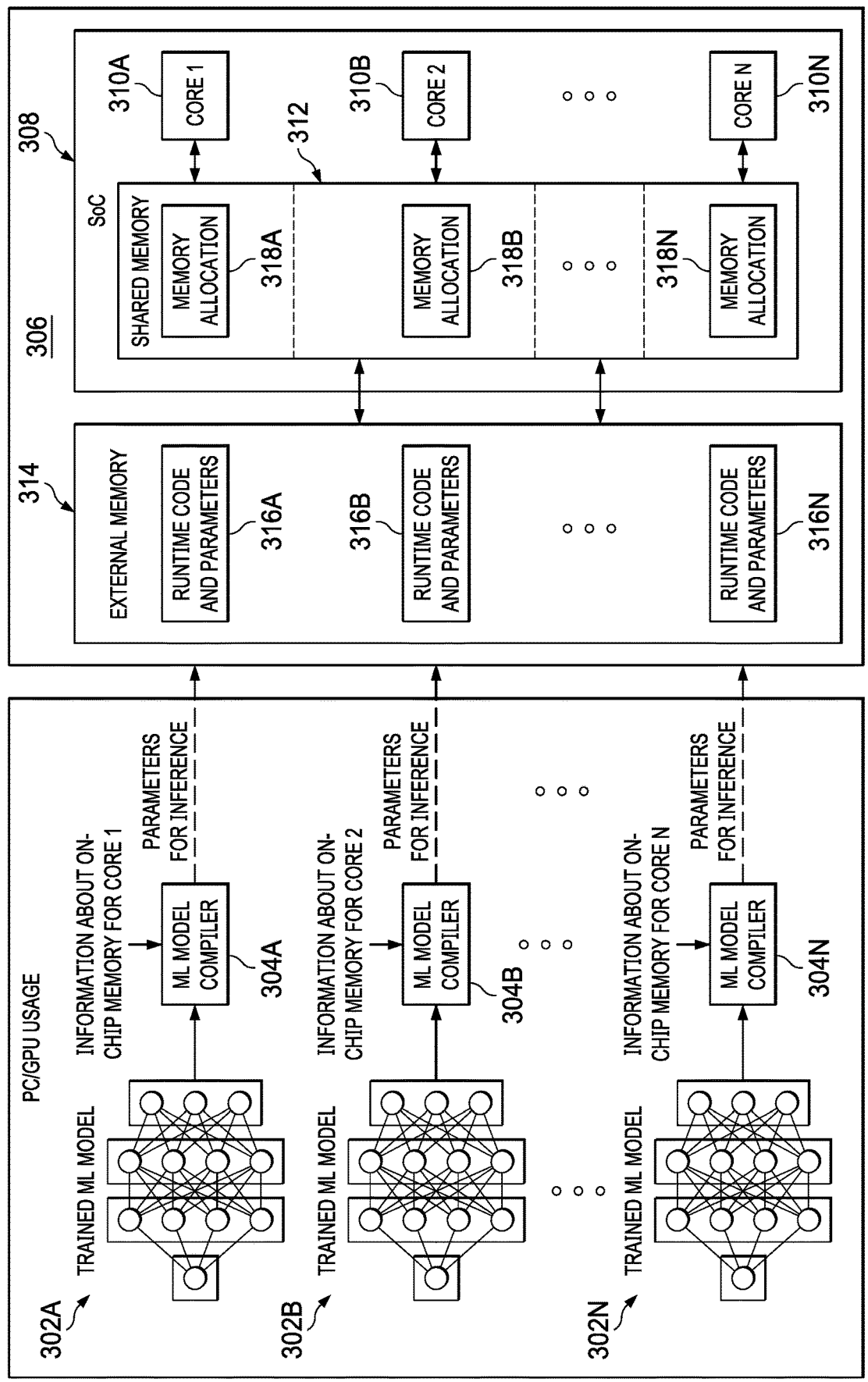
FIG. 3 is a block diagram of a process for compiling ML models for target hardware, in accordance with aspects of the present disclosure.

FIG. 3 is a block diagram 300 of a process for compiling ML models for target hardware, in accordance with aspects of the present disclosure. Machine learning models 302A, 302B . . . 302n (collectively 302) are trained during a training phase of development of the respective ML model 302. Training an ML model 302 teaches the ML model 302 to perform a task. For example, an ML model 302 for object recognition may be trained by presenting the ML model 302 with labeled images including an object, letting the ML model 302 attempt to identify the object in the image, and then adjusting parameters of the ML model 302, such as weights for layers of the ML model 302, based on how well the ML model 302 recognized the object.

Once an ML model 302 is trained, the ML model 302 may be compiled and translated for a target hardware by an ML model complier 304A, 304B, . . . 304n (collectively). In this example, the target hardware 306 is shown as a simplified version of the device shown in FIG. 1, and the target hardware 306 includes a SoC 308 with one or more cores 310A, 310B, . . . 310n, coupled to a shared memory 312. The SoC 308 is also coupled to external memory 314. The ML model compiler 304 helps prepare the ML model 302 for execution by the target hardware 306 by translating the ML model 302 to a runtime code 316A, 316B, . . . 316n (collectively 316) format that is compatible with the target hardware 306. In cases with multiple ML models 302 executing on multiple cores 310, the ML model compiler 304 may determine which core 310 an ML model 302 should run on. The ML model compiler 304 may also parameterize the ML model 302 being compiled. In some cases, the ML parameters may include information that may be dynamically loaded from memory for executing the ML model 302, such as weights, layer ordering information, structure, memory needed to store data input/output between layers, etc.

After compilation of the ML model 302 to runtime code 316 for the target hardware 306 the parameters of the ML model 302 may be stored, for example, in the external memory 314. When an ML model 302 is executed, the runtime code and parameters 316 may be loaded, for example, into a static memory allocation 318 in shared memory 312 or other memory. In some cases, a particular ML model 302 may be executed by an ML core 310 of the ML cores 310. Multiple ML models may be executed concurrently across the multiple ML cores. In some cases, certain ML models may be designated to execute on certain cores of the target hardware. For example, an ML model which uses more processing resources may be assigned to execute on a certain ML core which may have an increased amount of processing power, or multiple ML models which may use less processing resources may be assigned to execute together on another ML core.

The static memory allocation 318 for a given core and ML model may include space for storing data to be input and/or output from the layers of the ML model. The static memory allocation 318 may be a memory dedicated to a specific ML model. In some cases, the size of the static memory allocation 318 may be determined during ML model compilation. For example, an amount of data needed to be input to, or output from each layer of the ML model may be determined during the ML model compilation process 304 and the size of the static memory allocation 318 may be based on a largest amount of data needed to be input or output to a layer of the ML model. The size of the static memory allocation 318 may be fixed for each ML model. In some cases, the static memory allocation 318 may be ML core 310 specific and based on the ML models to be run on the particular ML core 310, such as static memory allocation 318A for ML core 310A. In cases where an executing ML model requires information that is not stored in internal (e.g., on-chip cache) or shared memory, the information may need to be loaded from external memory 314. Typically, accessing information from external memory 314 is substantially slower than accessing information stored in the shared memory 312. In some cases, a particular ML model 302 may be executed by an ML core 310 of the ML cores 310. Multiple ML models may be executed concurrently across the multiple ML cores.

Figure 4:
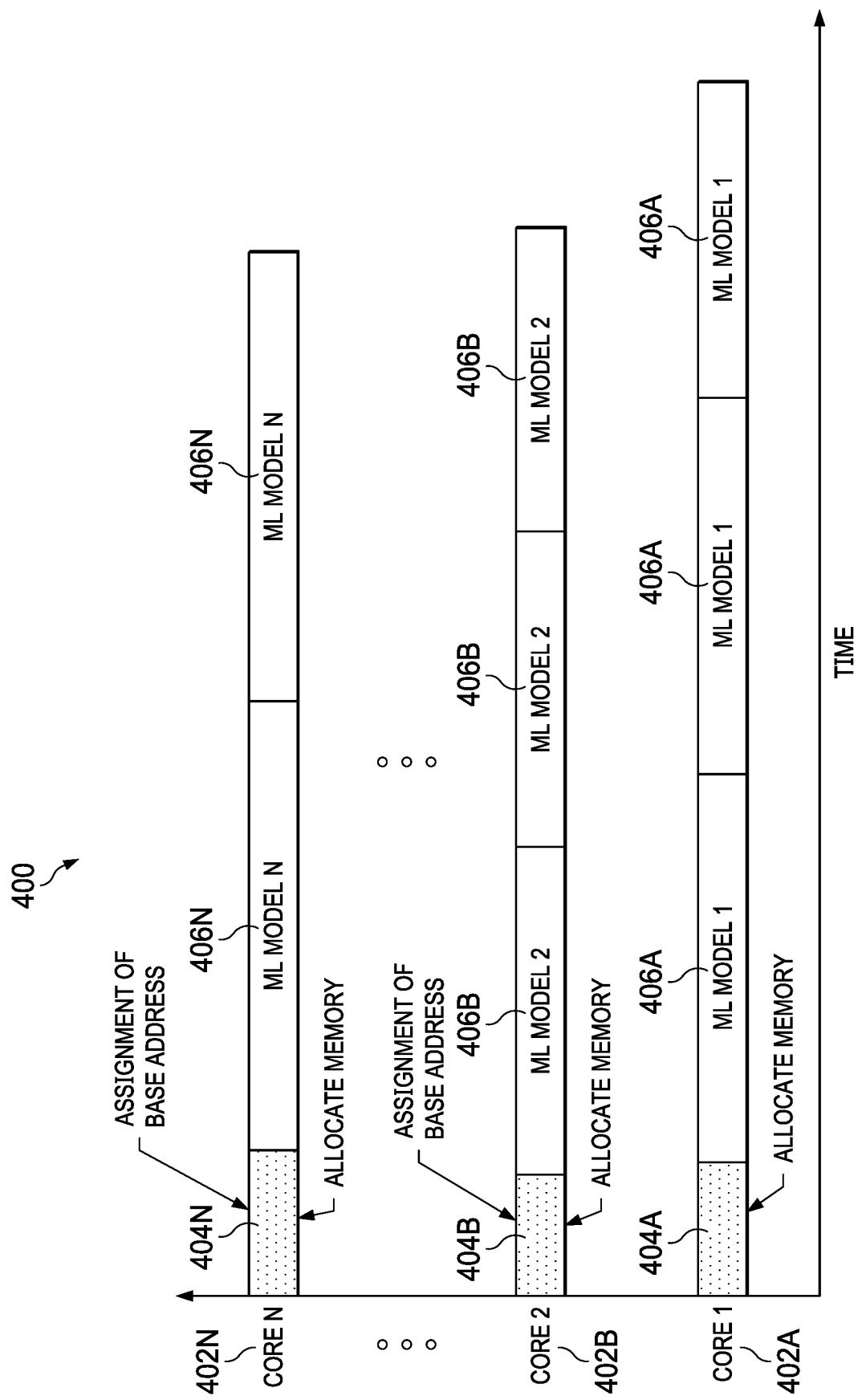
FIG. 4 is a timeline illustrating ML model execution across the computing cores, in accordance with aspects of the present disclosure.

FIG. 4 is a timeline 400 illustrating ML model execution across the computing cores, in accordance with aspects of the present disclosure. The timeline 400 includes an X-axis plotting time, and a Y-axis plotting activities performed by the cores 402A, 402B, . . . 402n (collectively 402). In some cases, each of the cores 402 may be a general purpose CPU, an ML core, or other processor on which an ML model may be run. In some cases, core 402 may be a physical core or a logical core. In some cases, the ML core 402 on which an ML model 406 is executed may be determined prior to execution, for example during compilation or during initialization, and may be static once determined. That is, the core 402 on which an ML model 406 is run does not change once the ML model 406 is initialized on the core 402 until ML model 406 execution is stopped. As shown, the ML model 406A may continue to run on a particular core 402A after initialization. In some cases, multiple ML models may be executed on a single core 402. Other ML models, such as ML models 406B . . . 406n, may be initialized and continue to run on other cores, such as cores 402B, . . . 402n. These ML models 406 may execute concurrently and asynchronously. That is, multiple ML models 406 may run at the same time without synchronization as between the ML models 406.

When initializing an ML model, such as ML model 406A, for execution, memory, such as a portion of the shared memory, may be allocated 404A for the ML model 406A prior to ML model 406A execution. The runtime code and parameters for the ML model may be stored in the static allocated memory 404 for use during ML model execution. As shown each executing ML model, such as 406A, 406B, . . . 406n may be associated with a static allocated memory space, such as 404A, 404B, . . . 404n, in the shared memory. A total size of the shared memory may then be based on a sum of the size of the static allocated memory spaces for the ML models to be run. In some cases, the size of the static allocated memory space for an ML model may be based on information obtained during the ML model compilation for the target hardware. In other cases, the size of the static allocated memory space for each ML model may be fixed.

Figure 5:
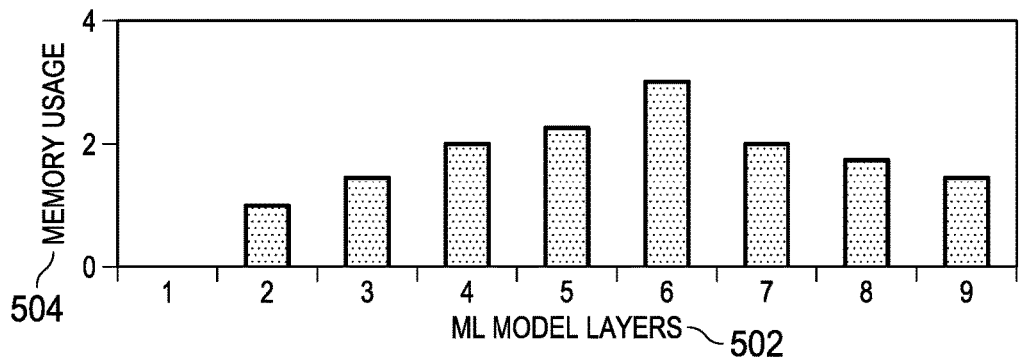
FIG. 5 is a chart illustrating memory usage of layers of an ML model, in accordance with aspects of the present disclosure.

FIG. 5 is a chart 500 illustrating memory usage of layers of an ML model, in accordance with aspects of the present disclosure. The chart 500 includes an X-axis plotting layers of an ML model 502 and a Y-axis plotting memory usage 504, in megabytes (MB), of the layers of the ML model. As shown, memory usage varies as between the layers of the ML model and the memory usage of a majority of the layers may be substantially below the layer with the highest memory usage; in this example, layer 6. Thus, sizing the static allocated memory space for the ML model based on the memory usage of the layer with the highest memory usage, e.g., layer 6 in this example, may result in an amount of static allocated memory not being used a majority of the time during the execution of the ML model.

In designing target hardware for executing ML models, the amounts of memory needed to be allocated for the ML models may not be known precisely, as the ML models to be run on the target hardware may not be fixed and ML models may be updated, so shared memory sizing of target hardware may be based on an expected 'worst case' design. As a result, a total amount of shared memory for the static allocated memory spaces in the shared memory of a target hardware design may expand linearly with an increased number of ML models expected to be executed on the target hardware. In accordance with aspects of the present disclosure, optimization techniques may help reduce an amount of memory resources needed to execute multiple ML models concurrently.

ML Model Memory Optimization

Figure 6:
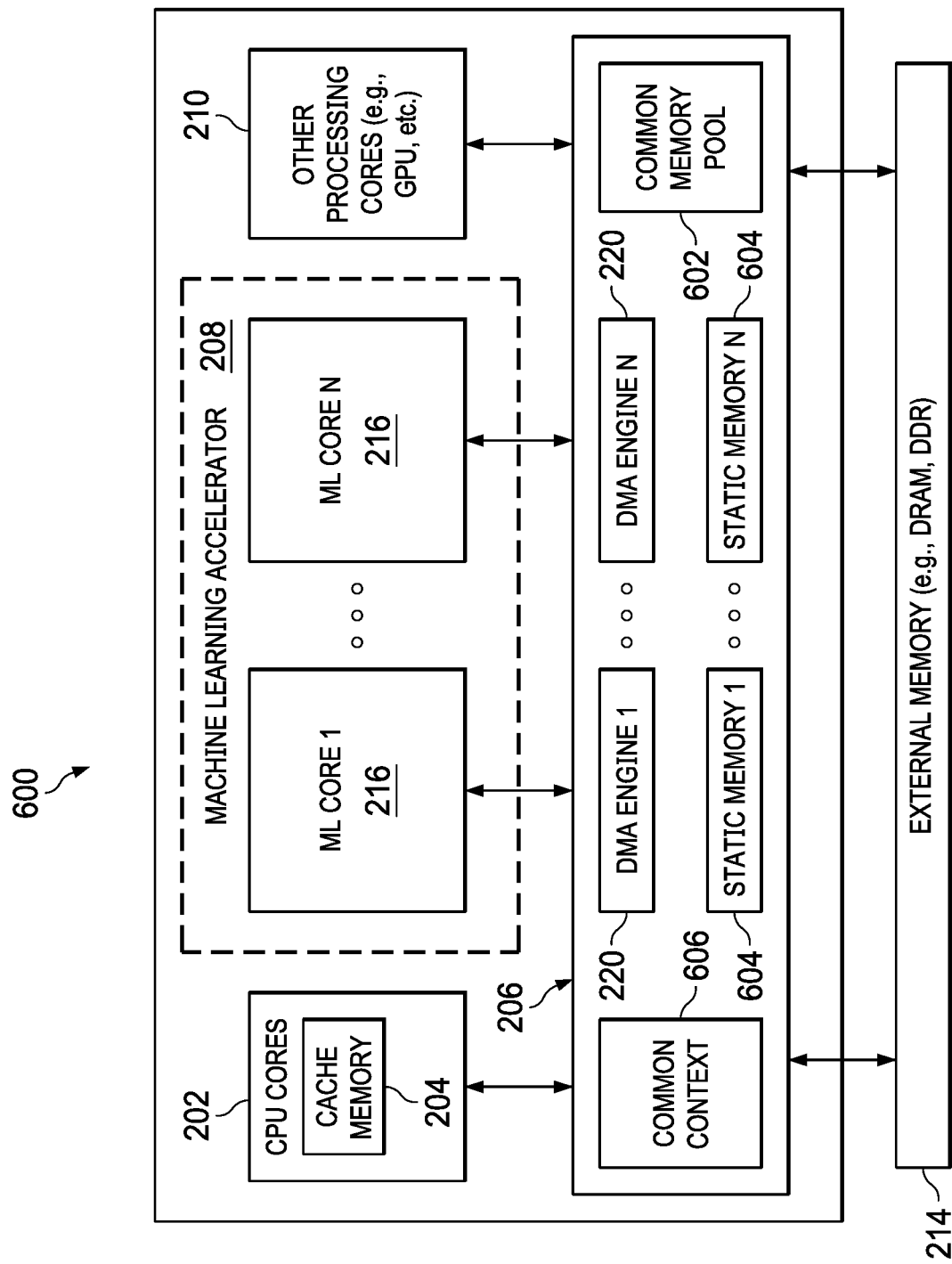
FIG. 6 is a block diagram of a device including hardware for executing ML models, in accordance with aspects of the present disclosure.

FIG. 6 is a block diagram 600 of a device including hardware for executing ML models, in accordance with aspects of the present disclosure. As with the device shown in FIG. 2, the device shown in FIG. 6 may be system on a chip (SoC) including one or more CPU cores 202, which may include one or more internal cache memories 204. The CPU cores 202 may be coupled to a crossbar (e.g., interconnect) 206 and the crossbar 206 couples the CPU cores 202 with other peripherals, such as an ML accelerator 208 including N ML cores 216, and other processing cores 210, such as a graphics processing unit, radio basebands, coprocessors, microcontrollers, etc., and external memory 214. The crossbar 206 may include one or more DMA engines 220. The DMA engines 220 may be associated with a particular ML core 216.

To help optimize the amount of memory resources needed to execute ML models, a common memory pool 602 (e.g., dynamic memory) for the ML cores 216 may be allocated in the shared memory space of the one or more internal memories included in, or accessible via, the interconnect 206. In some cases, an amount of static memory 604 dedicated for specific ML cores may be reduced to an amount relatively less than a maximum amount of memory needed to store data to be input and/or output from one or more layers of an ML model executing on the ML core. For example, assuming an ML core is executing an ML model with a memory usage per layer as shown in FIG. 5, the amount of static memory 604 for the ML core may be 2 MB, as compared to the 3 MB that may have been allocated if the static memory 604 were based on a maximum memory usage of the layers of the ML model. When executing the ML model layers which use less than, or equal to, the amount of memory in the static memory 604, such as layers 2-4 and 7-9 of the example shown in FIG. 5, may just use the memory in the static memory 604. Layers that use more memory than available in the static memory 604 may utilize memory from both the static memory 604 and the common memory pool 602.

The common memory pool 602 may then be used on a per-layer basis as needed by an ML model. Memory blocks in the common memory pool 602 may be allocated to the ML model when a layer which uses more memory than is available in the static memory 604 is executed and those memory blocks are released when the layer finishes execution. A common context 606 may be used to provide per-layer memory management of access to the common memory pool 602.

Figure 7:
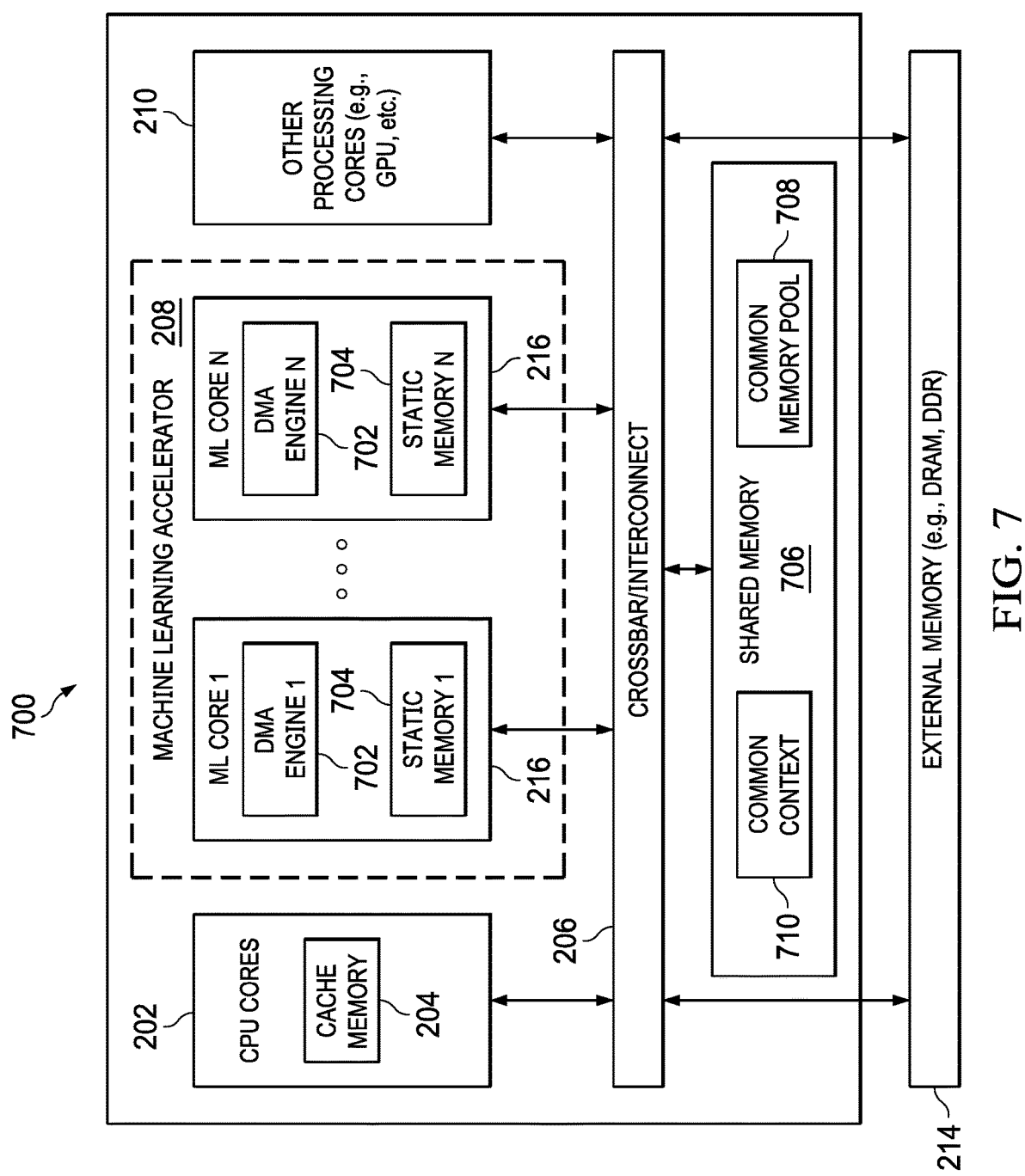
FIG. 7 is a is a block diagram of an alternative device including hardware for executing ML models, in accordance with aspects of the present disclosure.

FIG. 7 is a block diagram 700 of an alternative device including hardware for executing ML models, in accordance with aspects of the present disclosure. The alternative device shown in FIG. 7 is similar to the device shown in FIG. 6, except that the DMA engines 702 and static memory allocation 704 for the ML models are integrated into the ML cores 216. The ML cores 216 are coupled to crossbar 206. The crossbar 206 may include or may be coupled to a shared memory 706. Examples of a shared memory 706 may include an L4 cache or other on-chip memory. A common memory pool 708 may be allocated within the shared memory 706 and a common context 710 may be used to provide per-layer memory management of access to the common memory pool 708.

Figure 8:
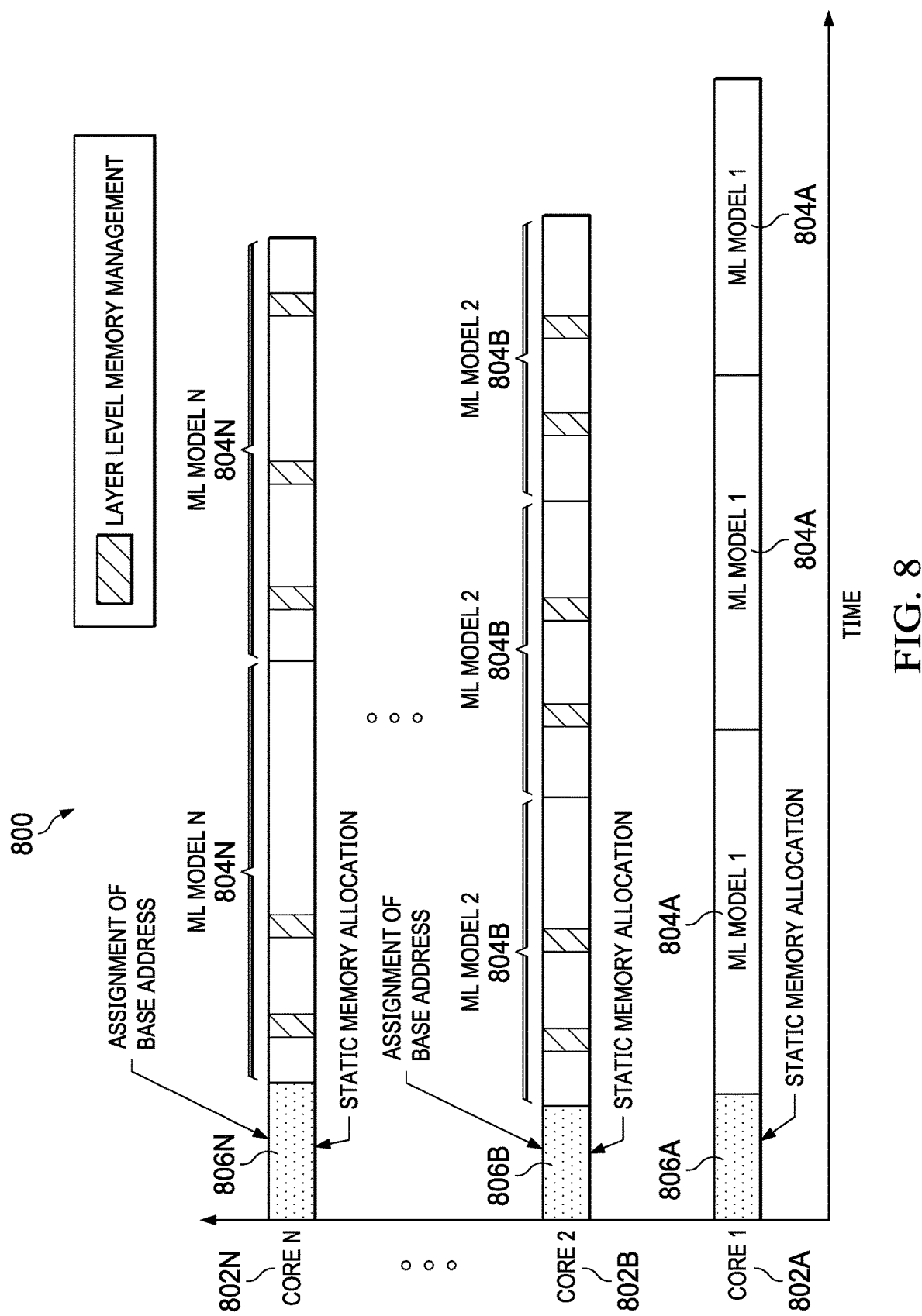
FIG. 8 is a timeline illustrating ML model execution across the computing cores, in accordance with aspects of the present disclosure.

FIG. 8 is a timeline 800 illustrating ML model execution across the computing cores, in accordance with aspects of the present disclosure. The timeline 800 includes an X-axis plotting time, and a Y-axis plotting activities performed by the cores 802A, 802B, . . . 802n (collectively 802). In some cases, the cores 802 may be physical general purpose CPUs, ML cores, or other processors on which ML models may be run. In some cases, cores 802 may be mapped to logical cores. As shown in this example, each core 802 is shown executing an ML model 804, with core 1 802A executing ML model 1 804A, core 2 802B executing ML model 2 804B, and core n executing ML model n 804n. Prior to executing the ML models 804, each core is allocated a static memory 806, with core 1 802A being allocated static memory 806A, core 2 802B being allocated static memory 806B, and core n 802n being allocated static memory 806n. In some cases, each static memory 806 may be a different size.

In some cases, such as for ML model 1 804A, the static memory 806A may be large enough for each layer of ML model 1 804A. In such cases, ML model 1 804A may execute from the static memory 806A without accessing the shared memory. In other cases, such as for ML model 2 804B and ML model n 804n, the static memory, such as static memory 806B and 806n, may not be large enough for each layer of the ML model, such as ML model 2 804B and ML model n 804n. In such cases, the ML model, such as ML model 2 804B and ML model n 804n, may execute using memory from both static memory dedicated to the cores 802, such as static memory 806B and 806n, and a common memory pool of the shared memory (e.g., dynamic memory).

Figure 9:
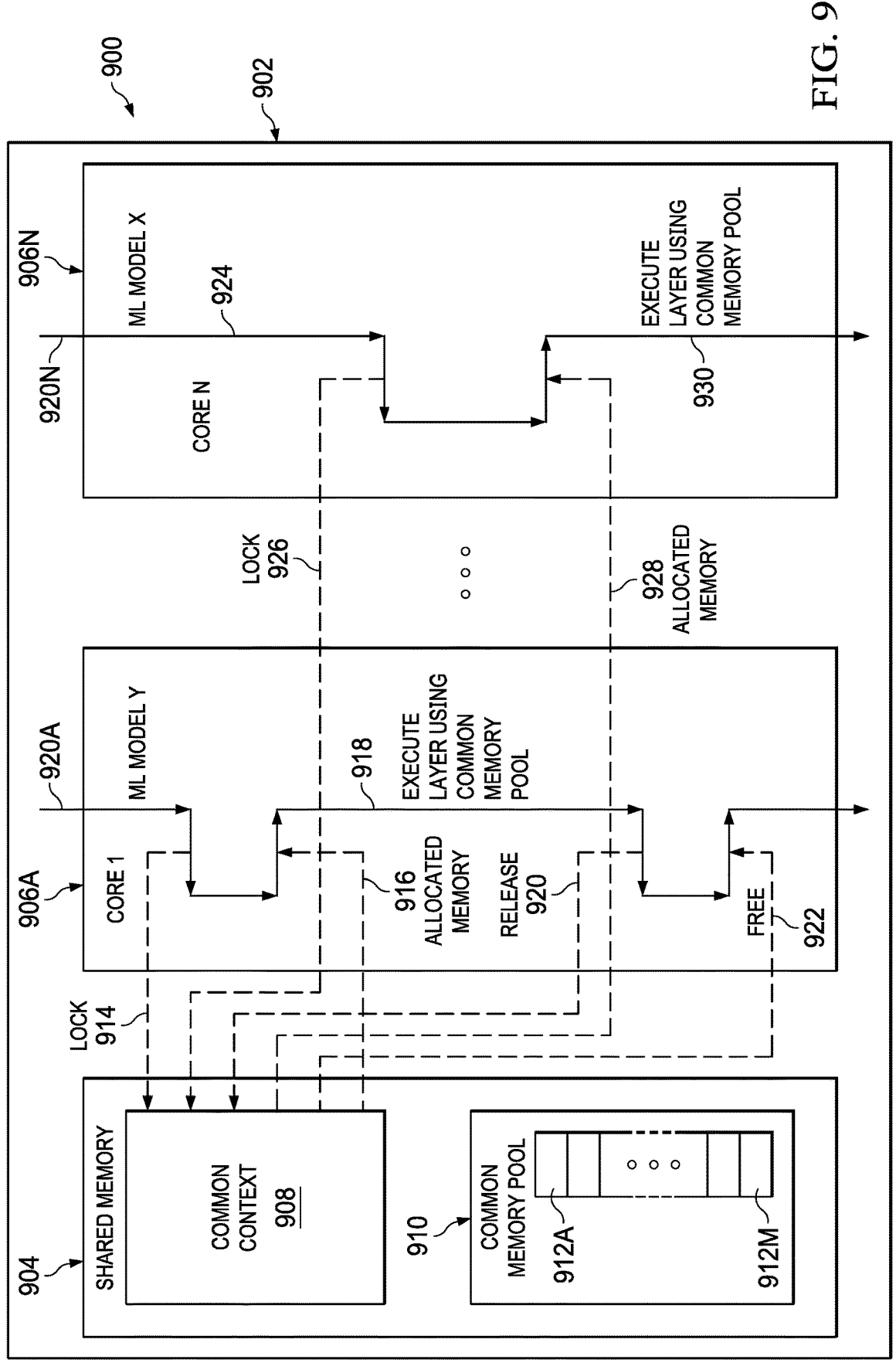
FIG. 9 is a block diagram illustrating a memory locking sequence, in accordance with aspects of the present disclosure.

FIG. 9 is a block diagram 900 illustrating a memory locking sequence, in accordance with aspects of the present disclosure. The block diagram 900 illustrates a simplified representation of the target hardware 902 including a shared memory 904 and representative cores 906A and 906n executing ML model Y 920A and ML model X 920n, respectively. The shared memory 904 includes a common context 908 and a common memory pool 910. The common memory pool 910 may be divided into n memory pages 912A ... 912n. The memory pages 912A ... 912m may be equally sized, for example, each memory page may be 256 KB in size.

In this example, layers of ML model Y 920A execute on the first core 906A. If the first core 906A determines that a layer of ML model Y 920A fits within the static memory dedicated to the first core 906A, that layer runs from the static memory dedicated to the first core 906A. If the first core 906A determines that the layer of ML model Y 920A does not fit within the static memory dedicated to the first core 906A, then the first core 906 may request 914 a portion of shared memory 904, such as from the common memory pool 910, from the common context 908. For example, the common context 908 may include an indication of resources, including memory, used by layers of the ML models, along with memory allocation information indicating what memory blocks are in use and what memory blocks are free in the common memory pool 910. In some cases, the first core 906A may access information indicating the resources used by the layer of ML model Y 920A in the common context 908 to determine whether the layer will fit within the static memory. The common context 908 tracks and coordinates memory allocations from the shared memory 904. The common context may also indicate, for each ML model and core the ML model is executing on, a list of the layers in the ML model that use memory from the common memory pool and the size of the memory used from the common memory pool. In some cases, the common context 908 may interface with a DMA engine and/or a memory management unit (MMU) for memory operations.

In some cases, an amount of memory used by each layer of a particular ML model may be determined during compilation of the ML model for the target hardware. This information about the amount of memory needed for a layer may be stored, for example, in the common context 908 and access during execution of the ML model by the core. The information about the amount of memory needed for a layer may be compared to the amount of static memory to determine a size of the portion of the shared memory 904 to request. In some cases, the shared memory request 914 may indicate a size of the portion of the shared memory 904 being requested by the first core 906A. The size of the portion may be indicated using a bitfield corresponding to a number of memory pages 912A ... 912M that are being requested.

The common context 908 may, in response to the shared memory request 914, be accessed to determine whether there is enough memory free in the common memory pool 910 to satisfy the shared memory request 914. In some cases, the common context 908 may be used to determine an amount of memory available in the common memory pool 910. For example, the common context 908 may indicate to a shared memory controller (e.g., MMU) to lock the shared memory and then walk (e.g., sequentially check) a portion of the common context including the memory allocation information indicating what memory blocks are in use and/or the pages of the shared memory to determine whether there are enough memory pages available and which pages of the shared memory are not being used by another core. Locking the shared memory helps allow the memory availability determination and allocation to be an atomic operation. The lock on the shared memory may be released after the memory availability determination and allocation is finished.

If there is enough memory free in the common memory pool 910, a portion of the common memory pool 910 may be allocated. For example, core may access a portion of the common context 908 memory structure in the shared memory 904 having memory allocation information and set an indication in the common context 908 indicating that certain memory pages are in use by the core. As a more detailed example, the core may set a flag in portions of the common context 908 which represent certain memory pages of the common memory pool 910 indicating that those memory pages are locked by the core. In some cases, memory may be allocated on a memory page by memory page basis. If there is not enough memory free in the common memory pool 910, the core may access the available memory from another memory, such as an external memory like DDR/DRAM.

In some cases, the core may access the static memory, memory from the common memory pool, and/or external memory using virtual memory addresses. These virtual memory addresses may be a set of contiguous virtual memory addresses mapped, for example by the MMU, to a set of corresponding portions of memory, such as memory pages 912A ... 912m of the common memory pool 910. In some cases, the contiguous virtual memory addresses may appear as an extension of the memory range of the allocated portion of the shared memory 904 (e.g., static memory). In some cases, the set of corresponding memory pages 912A ... 912m may not be a set of contiguous memory pages. In some cases, the virtual memory addresses may map to physical memory from more than one memory source. For example, the virtual memory address may address memory pages from the common memory pool in a L3 SRAM as well as memory pages from an external memory such as pages of DDR/DRAM memory. In some cases, if there is not enough memory free in the common memory pool 910, the common context 908 may stall execution of the ML model layer, for example by delaying returning response 916, until there is sufficient memory free in the common memory pool 910.

After the first core 906A receives the common memory pool range, the first core 906A may execute the layer 918 using memory from both the static memory dedicated to the first core 906A and the common memory pool of the shared memory 904. After the layer is finished executing, the first core 906A may issue a release request 920 to the common context 908 to release the allocated portion of the shared memory 904. The common context 908 may then return an indication 922 to the first core 906A that the portion of the shared memory 904 was freed.

Similarly, for core n 906n executing ML model X 920n, where core n 906n determines that a static memory is sufficient in size for a memory usage of a layer of the ML model X 920n, the layer executes 924 from the static memory. Where core n 906n determines that the static memory is insufficient in size for the memory usage of the layer of the ML model X 920n, core n 906n may transmit a shared memory request 926 to the common context 908 for a portion of the shared memory 904. The common context 908 may then allocate one or more memory pages 912A . . . 912m and transmit a response 928 indicating a common memory pool range of the shared memory 904 that the ML model X 920n may use. The core n 906n may then execute 930 the layer using the common memory pool range of the shared memory 904 as well as memory from the static memory dedicated to core n 906n.

Figure 10:
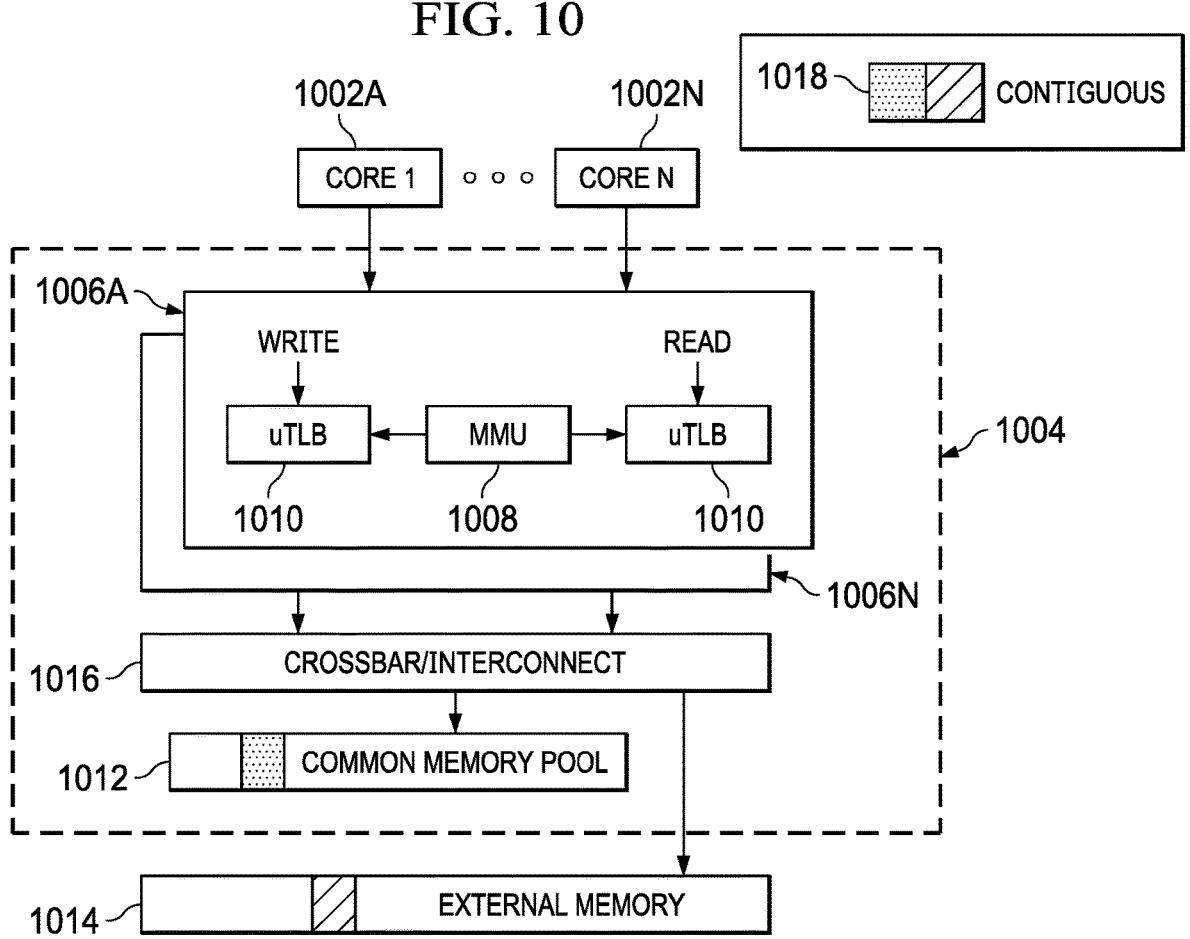
FIG. 10 is a block diagram of a device for executing ML models, in accordance with aspects of the present disclosure.

FIG. 10 is a block diagram 1000 of a device for executing ML models, in accordance with aspects of the present disclosure. As shown, the device may include representative cores 1002A . . . 1002n (1002 collectively). The cores 1002 may be coupled to a shared memory controller 1004. The shared memory controller 1004 may include a set of DMA engines 1006A . . . 1006N (1006 collectively). In some cases, the DMA engines 1006 may correspond to the cores 1002 such that each core, such as core 1002A, has a corresponding DMA engine, such as DMA engine 1006A. The DMA engines 1006 may include a memory management unit (MMUs) 1008. The MMU 1008 helps translate virtual memory addresses to physical memory addresses for the various memories that the shared memory controller 1004 can address, for example, using a set of page tables to map virtual page numbers to physical page numbers. The DMA engines 1006 may also include one or more micro translation lookaside buffers (uTLBs) 1010. The uTLBs 1010 may cache page translations for memory reads and writes. For example, uTLBs 1010 may cache memory pages which are locked for use by cores 1002. The MMU 1008 may be able to translate virtual memory addresses to physical memory addresses for each memory the DMA engine 1006 can access, including, for example, such as a common memory pool 1012 and/or an external memory 1014, such as DDR/DRAM. The shared memory controller may also include a crossbar 1016 (e.g., interconnect), which couples and interconnects various components of the device. In some cases, the crossbar 1016 may correspond to crossbar 206.

In some cases, the MMU 1008 may include a table of memory address and pages which are accessible to the MMU 1008 and which of these memory addresses and pages are in use. In some cases, the table of memory addresses and pages in the MMU 1008 may be a complete table of all of the memory addresses directly accessible by the MMU 1008. When a core, such as core 1 1002A, requests a portion of the shared memory, for example, via a common context, the MMU 1008 may determine whether the requested portion of the shared memory from the common memory pool 1012 is available. In this example, the MMU 1008 may determine that the common memory pool 1012 has an insufficient number of available memory pages. In some cases, the MMU 1008 may wait a threshold number of cycles or amount of time for memory pages to be released, for example, by another core such as core n 1002n. In some cases, if the threshold number of cycles or amount of time is reached and there is still an insufficient number of available memory pages in the common memory pool 1012, the MMU 1008 may allocate a portion of external memory 1014. In other cases, the MMU 1008 may stall until a sufficient number of memory pages in the common memory pool 1012 become available.

In some cases, the allocated memory pages, either in the common memory pool 1012, or in both the common memory pool 1012 and external memory 1014, may not be a contiguous set of memory pages. The MMU 1008 may map addresses of the allocated memory pages to a contiguous range 1018 of virtual memory addresses. In some cases, these mapped addresses may be cached in the uTLBs 1010. The contiguous range 1018 of virtual memory addresses may be returned to the core, such as core 1 1002A, for use by a layer of an ML model executing on the core. After the layer of the ML model is finished executing, the core, such as core 1 1002A may release the allocated memory pages.

Figure 11:
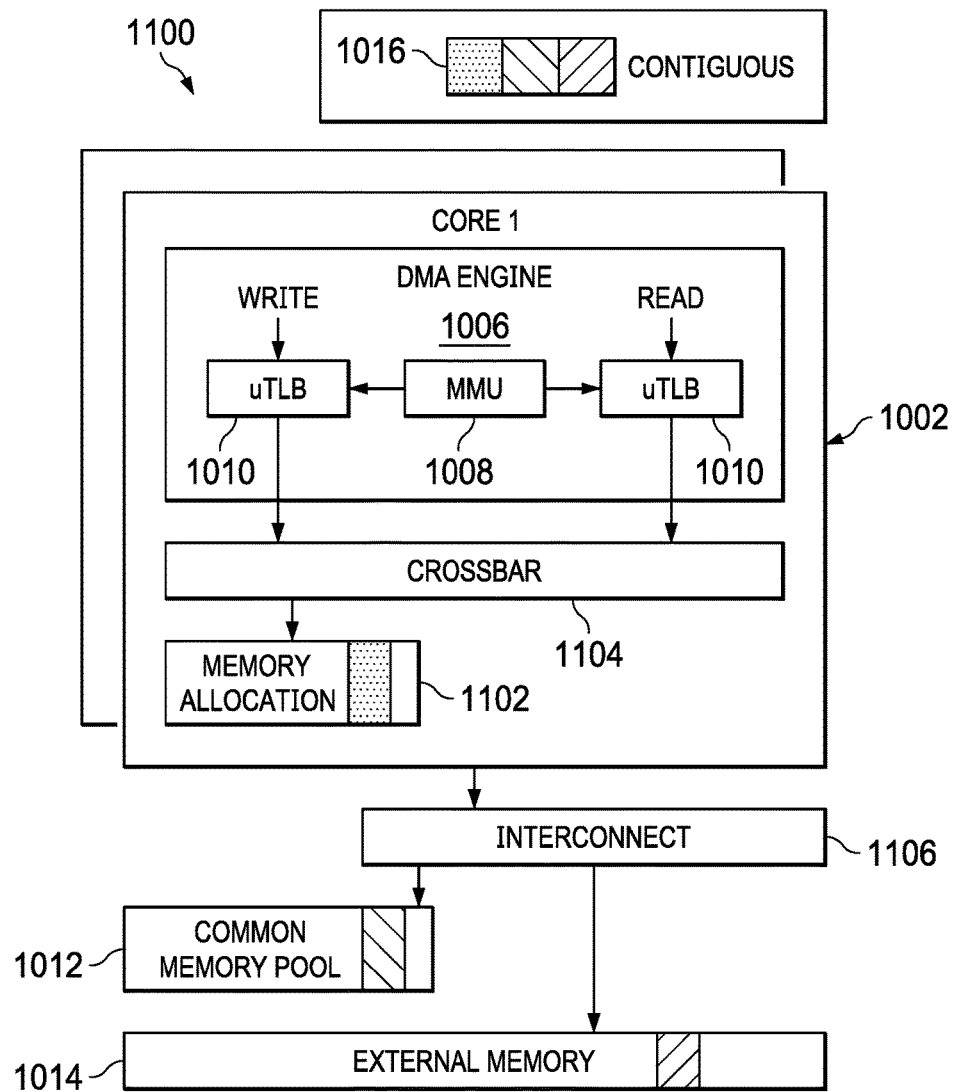
FIG. 11 is a block diagram of an alternative device for executing ML models, in accordance with aspects of the present disclosure.

FIG. 11 is a block diagram 1100 of an alternative device for executing ML models, in accordance with aspects of the present disclosure. The alternative device shown in FIG. 11 is similar to the device shown in FIG. 10, except that a memory 1102 for the static memory allocation is integrated into the ML core 1002 along with the DMA engine 1006, including MMU 1008 and uTLBs 1010, and a crossbar 1104 linking the uTLBs 1010 and memory 1102. The ML core 1002 may be coupled to the common memory pool 1012 and external memory 1014 via interconnect 1106. The DMA engine 1006, MMU 1008, uTLBs 1010 operate in a manner similar to that described for the device as shown in FIG. 10.

Figure 12:
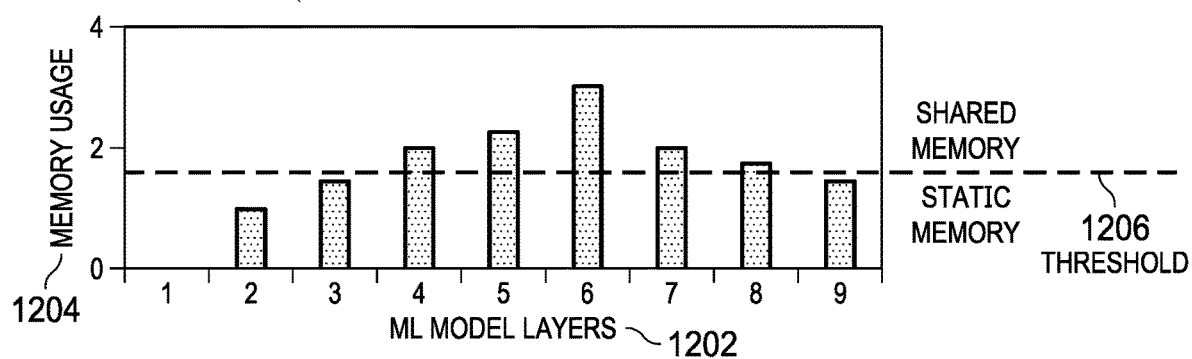
FIG. 12 is a chart illustrating memory usage of layers of an ML model, in accordance with aspects of the present disclosure.

FIG. 12 is a chart 1200 illustrating memory usage of layers of an ML model, in accordance with aspects of the present disclosure. The chart 1200 includes an X-axis plotting layers of an ML model 1202 and a Y-axis plotting memory usage 1204, in megabytes (MB), of the layers of the ML model. Additionally, a threshold 1206 amount of memory available for executing the ML model layers 1202 is shown. The threshold 1206 may represent an amount of static memory allocated for a core to execute the ML model layers 1202. If an ML model layer uses more than the threshold 1206 amount of memory, the ML model layer may use both static memory and shared memory to execute. In some cases, this threshold 1206 amount of memory may be determined. Increasing the threshold 1206, increases the layers that may execute from the static memory, but also increases an amount of static memory allocated for a core and increases an amount of physical memory for target hardware. Decreasing the threshold 1206 reduces the amount of static memory located for a core and decreases the amount of physical memory for the target hardware as more memory is shared across cores, but increases the use of the shared memory and increases the possibility that the common memory pool will be filled and an ML layer may be stalled or executed from external memory.

Figure 13:
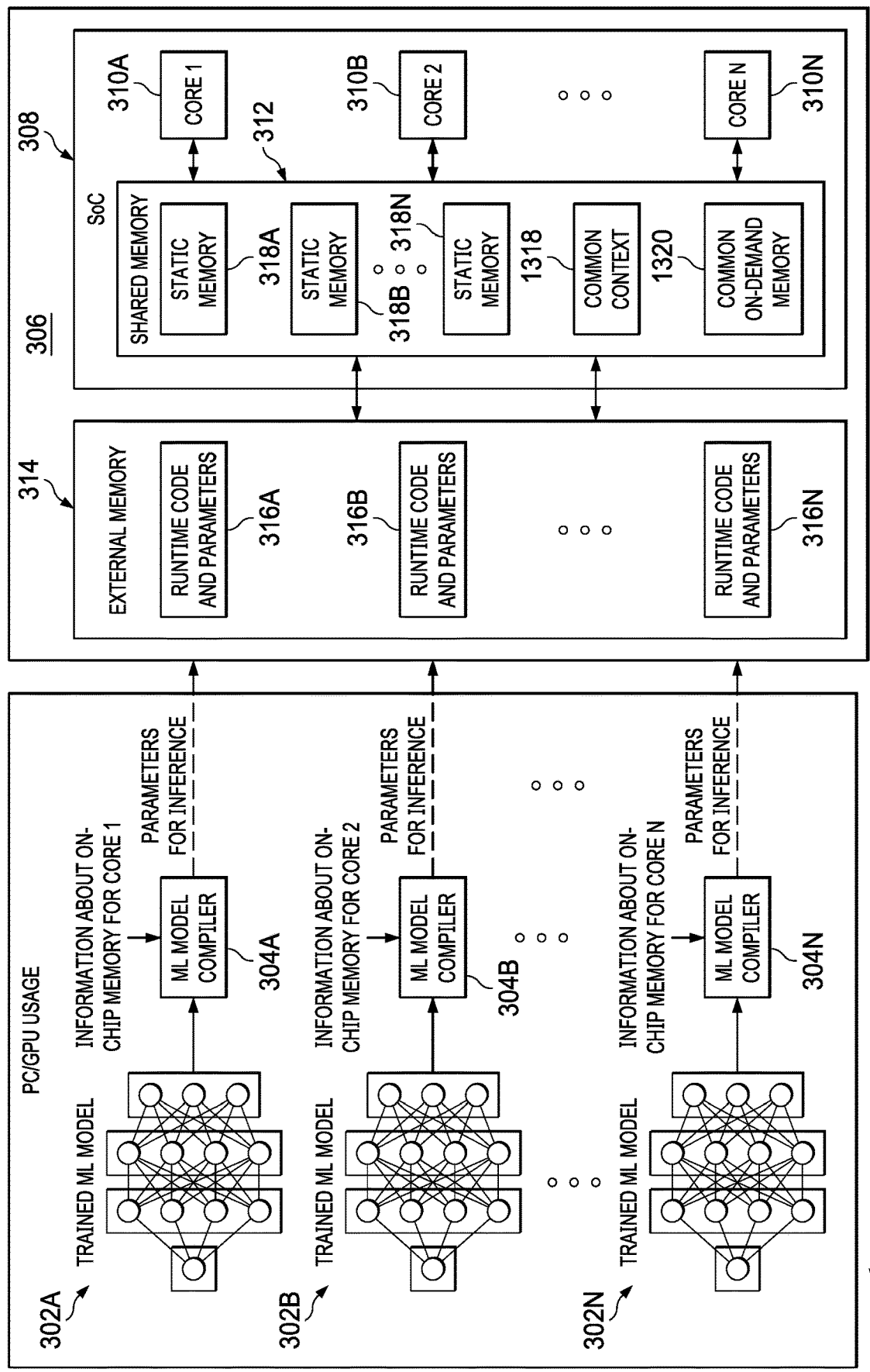
FIG. 13 is a block diagram of a process for optimizing ML models, in accordance with aspects of the present disclosure.

According to aspects of the present disclosure, the threshold 1206 may be determined as a part of preparing an ML model for execution on the target hardware, such as during a compilation and/or translation process. FIG. 13 is a block diagram 1300 of a process for optimizing ML models, in accordance with aspects of the present disclosure. As shown, trained ML models 302 may be compiled and/or translated for a target hardware by an ML model complier 304. In some cases, the simulations may be performed after the ML model is trained and as a part of preparing the trained ML model 302 for execution on the target hardware 306. For example, as a part of the compilation and/or translation process, ML model execution on the target hardware may be simulated. In some cases, the simulation of the ML model execution may be performed as a separate process from the compilation/translation process. In some cases, the simulation may be repeated with a number of variations of certain constraints including various amounts of available static memory 1318 allocated for the cores and various amounts of common memory 1320.

In some cases, the ML models may each be characterized on a layer by layer basis to determine, for each layer, an amount of time needed to execute the layer, an amount of memory used to execute the layer, and/or whether the layer may need to access dynamic memory when executing. In some cases, the simulation may characterize and obtain information about the execution of the ML model on the variations of the simulated target hardware. This information may include an indication of how much memory may be used by layers of the ML model, whether the layers may execute from shared memory as well as the static memory allocated for a core based on the variation of the amounts of allocated static memory and internal shared memory (e.g., common memory pool), an amount of static memory and shared memory used for the layer, an amount of time/cycles a layer spends executing using the shared memory, and a total amount of time/cycles used to execute all layers.

The information about the execution of the ML model may be applied to one or more cost functions for determining a threshold representing the amount of static memory allocated for a core. For example, a first cost function may be defined based on an amount of time/cycles the layers of the ML model spent executing using the shared memory divided by the total amount of time/cycles spent executing all the layers of the ML model. As another example, a second cost function may be defined based on an average amount of the shared memory used by a layer of the ML model divided by the size of the internal shared memory.

Figure 14:
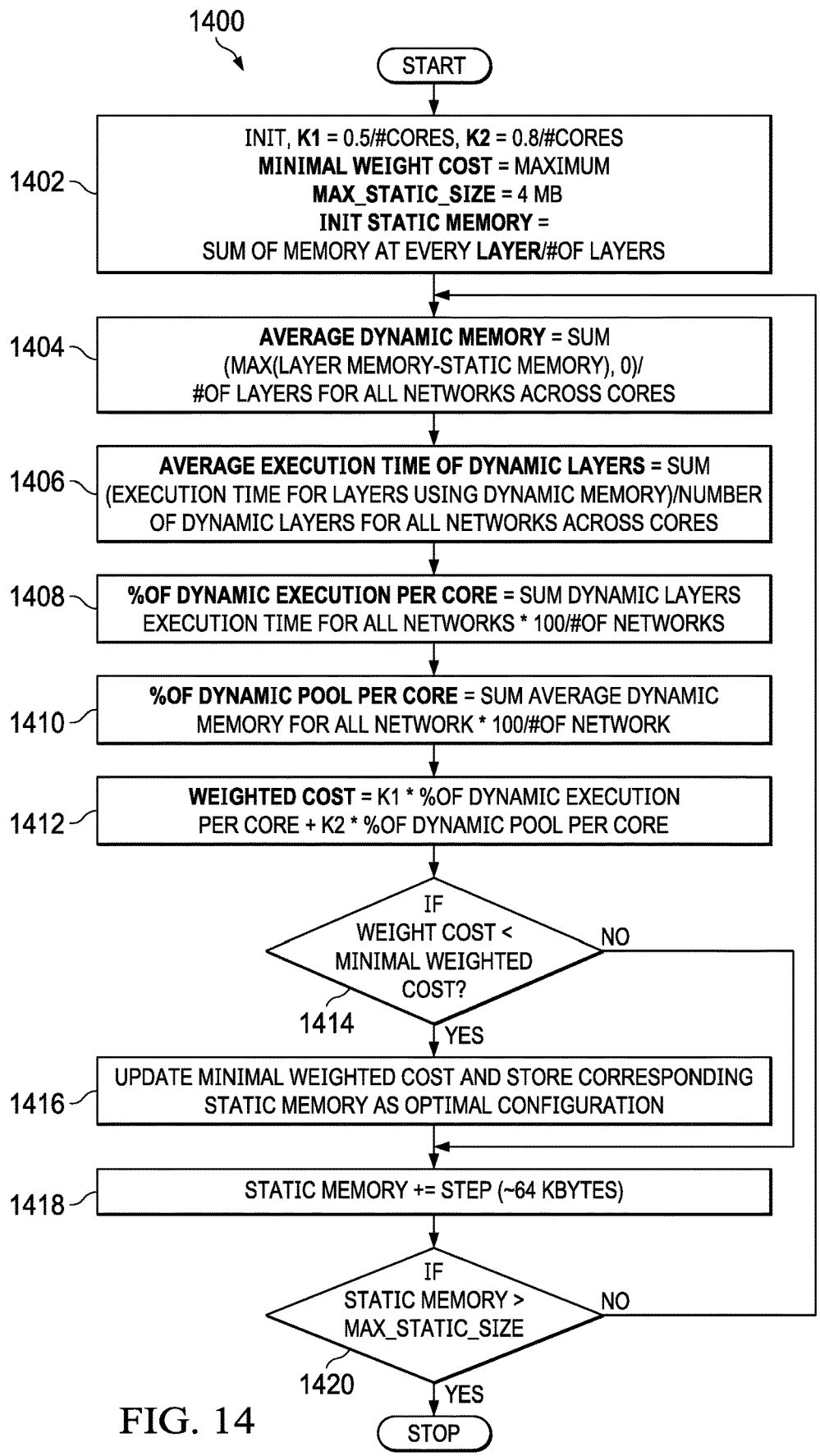
FIG. 14 is a flowchart illustrating a technique for determining an amount of base memory to allocate for a core, in accordance with aspects of the present disclosure.

FIG. 14 is a flowchart 1400 illustrating a technique for determining an amount of base memory to allocate for a core, in accordance with aspects of the present disclosure. The technique illustrated in FIG. 14 may be used in conjunction with simulating the execution of ML models expected to be run on the target hardware. The technique may be used to determine an amount of static memory to allocate for each core. Initially, a set of variables and/or constants may be defined at step 1402. In this example, the constants include K1 and K2, which may be defined based on a target resource utilization to avoid resource usage conflicts, such as between multiple executing ML models. For example, K1 may be based on a limit to an amount of processing cycles that an ML model may utilize, and K2 may be based on a limit to an amount of shared memory that the ML model may utilize. The minimum weight cost variable may be initialized to a maximum value. A maximum size of the shared memory may also be defined. An initial size of the shared memory may be set with respect to an average amount of memory used by the layers of the ML model.

At step 1404 an average amount of shared memory used may be determined. In this example, the average amount of shared memory used may be determined by finding the maximum of either zero or an amount of memory needed by a layer that exceeds the current amount of static memory. This is then summed across all of the layers and divided by the number of layers for all of the ML models that are expected to be run on the target hardware.

At step 1406, an average execution time of the layers that use the shared memory may be determined. In this example, the average execution time may be determined by tracking and summing an amount of time used to execute layers of the ML models which utilize shared memory dividing this total amount of time by a number of layers for all of the ML models that utilize the shared memory.

At step 1408, a percentage of time spent executing layers which utilize dynamic memory per core may be determined. In this example, the percentage of time may be determined by summing an amount of time used to execute layers of the ML models which utilize shared memory for a given core, multiplied by 100 and divided by a number of ML models executing on the given core.

At step 1410, a percentage of shared memory used per core may be determined. In this example, the percentage of shared memory used per core may be determined based on the average amount of shared memory used summed for all ML models executing on a given core, multiplied by 100 and divided by the number of ML models executing on the given core.

At step 1412, a weighted cost is determined. In this example, the weighted cost may be based on the constant K1 multiplied by the percentage of time spent executing layers which utilize shared (e.g., dynamic) memory per core calculated at step 1408 summed with the constant K2 multiplied by the percentage of shared memory used per core calculated at step 1410. This weighted cost is compared to the minimum weight cost variable. In some cases, the minimum weight cost variable tracks the lowest weight cost as the amount of static memory is varied. If the determined weighted cost is lower than the previous minimum weight cost variable, at step 1416, the minimum weight cost variable is updated based on the determined weighted cost, and the corresponding static memory amount is stored. At step 1418, the size of the shared memory may be incremented by a step. For example, the size of the shared memory may be incremented by 64 Kb for each iteration. At step 1420, the static memory amount is compared to the maximum size of the shared memory and if the static memory amount has exceeded the maximum size, then the process stops. The minimum weight cost variable and corresponding static memory amount may be stored If the static memory amount is less than the maximum size, then the process loops to step 1404.

Figure 15:
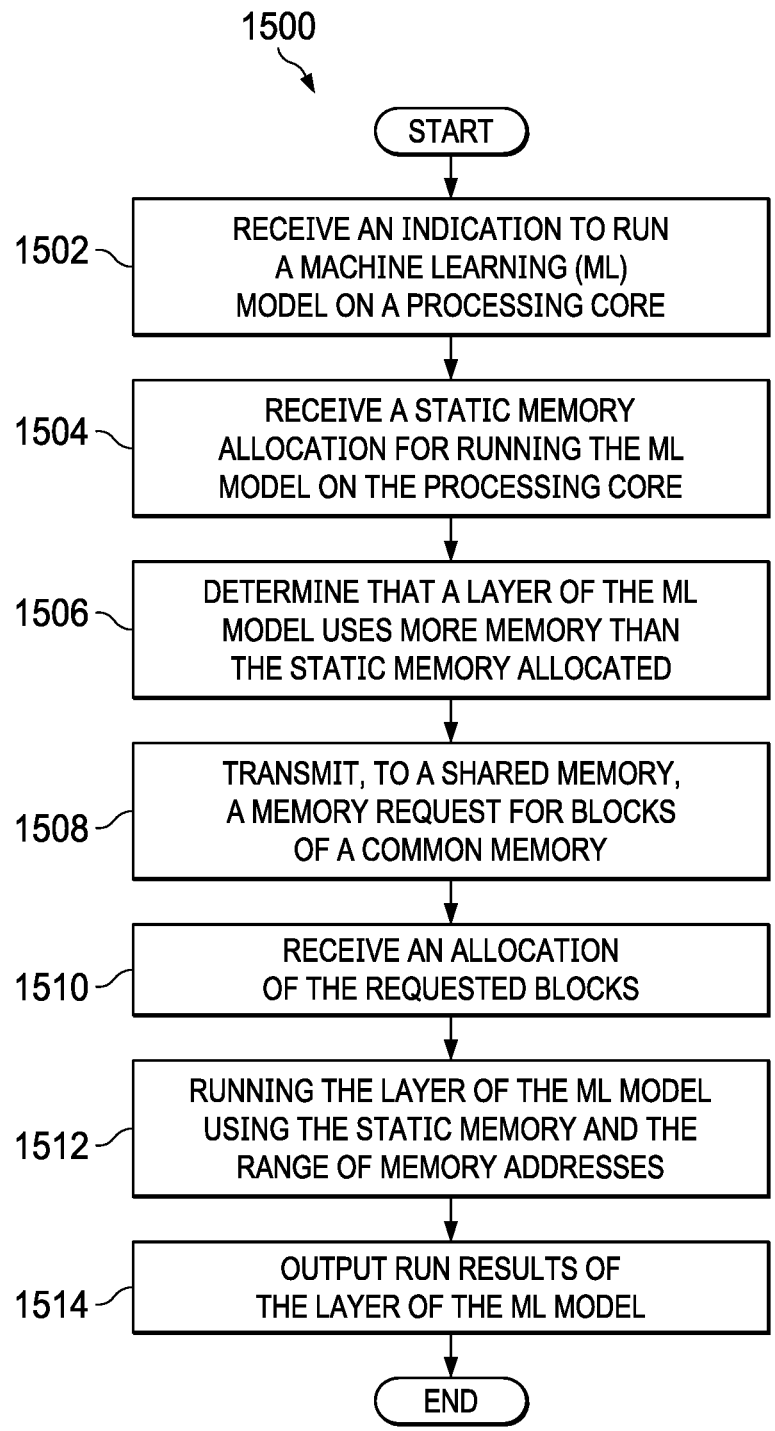
FIG. 15 is a flow diagram illustrating a technique for running an ML model, in accordance with aspects of the present disclosure.

FIG. 15 is a flow diagram 1500 illustrating a technique for running an ML model, in accordance with aspects of the present disclosure. At step 1502, an indication to run a machine learning (ML) model on a processing core is received. For example, execution of an ML model may be triggered on a processor core, such as an ML processor. At step 1504, a static memory allocation for running the ML model on the processing core may be received. For example, the ML model may be associated with a static memory of a particular size. The size of the static memory associated with the ML model may be determined based, at least in part, on simulations of the ML model on target hardware. The memory associated with the static memory allocation of a given core may be assigned and initialized prior to execution of the ML model by the core. At step 1506, a determination that a layer of the ML model uses more memory than the static memory allocated may be made. For example, layers of the ML model may require differing amounts of memory to execute. In some examples, the determination is made after a layer is already being executed by the core, and thus, the running layer may request more memory than is available in the static memory. In another example, the common context may be preconfigured with information regarding the memory usage of layers of the ML model and the specific layer of the ML being executed may be tracked. The information regarding the memory usage of layers of the ML model may be generated during simulated runs of the ML model for the target hardware.

At step 1508, a memory request for blocks of a common memory of a shared memory may be transmitted. For example, a shared memory may include a common memory pool which multiple running ML models may access. To access the common memory pool, a memory request for memory from the common memory pool may be generated and sent, for example, by a DMA engine. At step 1510, an allocation of the requested blocks are received. For example, in response to the memory request, memory from the common memory pool may be allocated for running a layer of the ML model. In some cases, the requested block may include a range of memory addresses from the common memory allocated for running the ML model, where the range of memory addresses comprise a range of virtual memory addresses. Memory addresses associated with the memory allocated may be mapped to a virtual memory range and this virtual memory range returned to the executing ML model. In some cases, this virtual memory range may be a contiguous memory range. At step 1512, the layer of the ML model is run using the static memory and the range of memory addresses. In some cases, a release request is transmitted to the shared memory to free the range of memory addresses after the layer of the ML mode is run. For example, after the layer of the ML model is run, the memory from the common memory pool may be released. In some cases, this release may be transmitted before executing a next layer of the ML model. At step 1514, run results of the layer of the ML model are output.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:

1. A method, comprising:
    receiving an indication to run a portion of a machine learning (ML) model on a processing core;
    receiving a static memory allocation for running the ML model on the processing core;
    determining that a layer of the ML model uses more memory than the static memory allocation;
    transmitting, to a shared memory, a memory request for blocks of the shared memory;
    receiving an allocation of the requested blocks;
    running the layer of the ML model using the static memory and the requested blocks of the shared memory; and
    outputting results of running the layer of the ML model.

2. The method of claim 1, wherein the allocation includes a range of memory addresses from the shared memory allocated for running the ML model, and wherein the range of memory addresses comprise a range of virtual memory addresses.

3. The method of claim 2, wherein the range of memory addresses comprises a contiguous range of memory addresses, wherein the contiguous range of memory addresses comprises virtual memory addresses, and wherein memory addressed by the contiguous range of memory addresses includes memory in the static memory and memory in the shared memory.

4. The method of claim 1, further comprising transmitting, to the shared memory, a release request to free the allocation, wherein the release request is transmitted after the layer of the ML model is run and before a next layer of the ML model is run.

5. The method of claim 1, wherein the memory request comprises a bitfield corresponding to a number of memory pages in the shared memory.

6. The method of claim 1, wherein the shared memory comprises a scratch memory, and further comprising:
    determining an available amount of the shared memory is insufficient;
    determining that a threshold amount of time has elapsed;
    allocating the available amount of the shared memory for the layer of the ML model; and
    allocating an amount of memory from an external memory for the layer of the ML model, wherein the allocated memory includes memory addresses from the shared memory and addresses from the external memory.

7. The method of claim 1, wherein the shared memory comprises a scratch memory, and further comprising:
    determining an available amount of the shared memory is insufficient for the memory request; and
    waiting until the available amount of the shared memory is sufficient for the memory request.

8. The method of claim 1, wherein an amount of static memory allocated is predetermined based on memory usage of layers of the ML model.

9. The method of claim 8, wherein the amount of static memory and shared memory allocated is predetermined based on simulated runs of the ML model on target hardware.

10. An electronic device, comprising:
    a memory; and
    one or more processors operatively coupled to the memory, wherein the one or more processors are configured to execute instructions causing the one or more processors to:
        receive an indication to run a portion of a machine learning (ML) model on a processing core;
        receive a static memory allocation for running the ML model on the processing core;
        determine that a layer of the ML model uses more memory than the static memory allocation;
        transmit, to a shared memory portion of the memory, a memory request for blocks of the shared memory;
        receive an allocation of the requested blocks;
        run the layer of the ML model using the static memory and the requested blocks of the shared memory; and
        output results of running the layer of the ML model.

11. The electronic device of claim 10, wherein the allocation includes a range of memory addresses from the shared memory portion allocated for running the ML model, and wherein the range of memory addresses comprise a range of virtual memory addresses.

12. The electronic device of claim 11, wherein the range of memory addresses comprises a contiguous range of memory addresses, wherein the contiguous range of memory addresses comprises virtual memory addresses, and wherein memory addressed by the contiguous range of memory addresses includes memory in the static memory and memory in the shared memory.

13. The device of claim 10, wherein the instructions further cause the one or more processors to transmit, to the shared memory, a release request to free the allocation, wherein the release request is transmitted after the layer of the ML model is run and before a next layer of the ML model is run.

14. The device of claim 10, wherein the memory request comprises a bitfield corresponding to a number of memory pages in the shared memory.

15. The device of claim 10, wherein the device further comprises an external memory, wherein the shared memory comprises a scratch memory, and wherein the instructions further configure the processors to:
   determine an available amount of the shared memory is insufficient;
   determine that a threshold amount of time has elapsed;
   allocate the available amount of the shared memory for the layer of the ML model; and
   allocate an amount of memory from an external memory for the layer of the ML model, wherein the allocated memory includes memory addresses from the shared memory and addresses from the external memory.

16. The device of claim 10, wherein the shared memory comprises a scratch memory, and wherein the instructions further configure the processors to:
   determine an available amount of the shared memory is insufficient; and
   wait until the available amount of the shared memory is sufficient.

17. The device of claim 10, wherein an amount of static memory allocated is predetermined based on memory usage of layers of the ML model.

18. The device of claim 17, wherein the amount of static memory and shared memory allocated is predetermined based on simulated runs of the ML model on target hardware.

19. A non-transitory program storage device comprising instructions stored thereon to cause one or more processors to:
   receive a set of ML models;
   simulate running the set of ML models on a target hardware; and
   determine an amount of static memory and shared memory resources of the target hardware for running layers of ML models of the set of ML models based on the simulated runs, wherein the amount of static memory is less than a maximum amount of memory used by the layers of the ML models, wherein the maximum amount of memory used is determined based on the simulation.

20. The non-transitory program storage device of claim 19, wherein the determining an amount of static memory and shared memory resources of the target hardware is based on one or more cost functions.

* * * * *